United States Patent
Parolari et al.

(10) Patent No.: US 8,737,365 B2
(45) Date of Patent: May 27, 2014

(54) METHOD OF ALLOCATING UPLINK RADIO RESOURCES

(75) Inventors: Sergio Parolari, Milan (IT); Leonardo Provvedi, Eastleigh (GB)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1086 days.

(21) Appl. No.: 12/068,566

(22) Filed: Feb. 7, 2008

(65) Prior Publication Data
US 2008/0259880 A1  Oct. 23, 2008

(30) Foreign Application Priority Data

Feb. 7, 2007 (GB) .................................. 0702325.2
Jul. 27, 2007 (GB) .................................. 0714579.0

(51) Int. Cl.
*H04J 3/00* (2006.01)
(52) U.S. Cl.
USPC ........... 370/337; 370/328; 370/329; 370/336; 455/500; 455/507; 455/509
(58) Field of Classification Search
CPC ...................... H04W 72/0493; H04W 72/042
USPC .......................................................... 370/329
See application file for complete search history.

(56) References Cited

U.S. PATENT DOCUMENTS

| | | | | |
|---|---|---|---|---|
| 7,020,105 | B2 * | 3/2006 | Cooper | 370/321 |
| 7,092,373 | B2 * | 8/2006 | Parantainen et al. | 370/337 |
| 8,320,312 | B2 * | 11/2012 | Olsson et al. | 370/329 |
| 2004/0120317 | A1 * | 6/2004 | Forssell | 370/394 |
| 2004/0258029 | A1 * | 12/2004 | Beard et al. | 370/337 |
| 2008/0019310 | A1 * | 1/2008 | Sebire et al. | 370/329 |

FOREIGN PATENT DOCUMENTS

| | | |
|---|---|---|
| EP | 0 539 220 | 4/1993 |
| EP | 1835670 A1 | 9/2007 |
| RU | 2122288 | 11/1998 |
| RU | 2201035 | 3/2003 |

OTHER PUBLICATIONS

Siemens, "Analysis of DTM with reduced TTI," May 22-24, 2006.*
Ericsson, "CR 43.064-0044 rev 5 Introduction of Reduced TTI", GERAN#32, Nov. 16-20, 2006, pp. 1-15, vol. 7.2.0, 3GPP, Sophia Antipolis, France.
Siemens, "Working Assumption for RTTI blocks", GERAN#31, Sep. 4-8, 2006, pp. 1-3, 3GPP, Denver, USA.
Siemens Networks, "Flexible timeslot assignment", Siemens Networks, GERAN#32, Nov. 13-17, 2006, pp. 1-16, 3GPP, Sophia Antipolis, France.

(Continued)

*Primary Examiner* — Hassan Kizou
*Assistant Examiner* — Amy Ling
(74) *Attorney, Agent, or Firm* — Staas & Halsey LLP (57) ABSTRACT

A method of allocating uplink radio resources to a mobile device, in which uplink and downlink timeslots are allocated, and the sum of the allocated uplink timeslots and the allocated downlink timeslots within a predetermined period is less than the total number of assigned time slots and does not exceed a predetermined maximum. The resources are allocated in a reduced transmission time interval configuration, in which an indication of the uplink timeslot allocation is received from the network in a downlink timeslot, or downlink timeslot pair, directing the mobile device to transmit only in one uplink timeslot pair.

15 Claims, 4 Drawing Sheets

(56) References Cited

OTHER PUBLICATIONS

Siemens Networks, "CR 45.002-0112 rev 1 Flexible timeslot assignment (Rel-7)", GERAN#32, Nov. 13-17, 2006, pp. 1-4, 3GPP, Sophia Antipolis, France.

Siemens Networks, "CR 44.060-0870 rev 1 Flexible timeslot assignment (Rel-7)", GERAN#32, Nov. 13-17, 2006, pp. 1-2, 3GPP, Sophia Antipolis, France.

Siemens Networks, "RTTI and FANR—preliminary results for VoIP", GERAN#32, Nov. 13-17, 2006, pp. 1-6, 3GPP, Sophia Antipolis, France.

Ericsson, "Bandwidth requirement of VoIP with 10 ms TTI", Jan. 16-20, 2006, pp. 1-13, 3GPP, Brussels, Belgium.

Siemens, Analysis of DTM with reduced TTI, 3GPP TSG GERAN #29BIS, (online) No. G2-060192, May 22, 2006, XP 002480830, Sophia-Antipolis, France, Retrieved from the Internet: URL:www.3gpp.org> (retrieved on May 20, 2008) the whole document.

Siemens Networks; Nokia, Uplink allocation strategies for RTTI TBFs, 3GPP TSG GERAN #33, No. GP-070272, Feb. 12, 2007, XP002480831, Seoul, Korea, section 3. Allocation strategies for RTTI TBFs.

\* cited by examiner

METHOD OF ALLOCATING UPLINK RADIO RESOURCES

CROSS REFERENCE TO RELATED INVENTION

This application is based on and hereby claims priority to British Applications No. GB 0702325.2 filed on Feb. 7, 2007 and GB 0714579.0 filed on Jul. 27, 2007, the contents of which are hereby incorporated by reference.

BACKGROUND

A method allocates uplink radio resources in a reduced transmission time interval (RTTI) configuration, in particular for enhanced general packet radio service (EGPRS) in global system for mobile communications (GSM)/enhanced data rates for global evolution (EDGE) radio access network (GE-RAN).

In some systems in which transmission and reception cannot occur at the same time. In order to allow timeslots having the same timeslot number to be used for both transmission and reception, conventionally, in frames of eight timeslots, the downlink and uplink timeslots having the same timeslot numbers are shifted by three timeslot periods from one another.

As, typically, several mobile devices or users share the same uplink timeslots, they need to know which of them is permitted to use a timeslot at any particular time. The network provides a notification, in the downlink timeslots, of which mobile device can transmit on each uplink timeslot. The network uses an uplink status flag (USF) in the downlink which has a value corresponding to a unique number given to the mobile, to indicate which mobile device can use the next uplink timeslot. This process of indicating which device can use an uplink timeslot is referred to as "allocation", which is different from the "assignment" of timeslots that occurs, typically, during session set-up. Assignment of timeslots refers to granting of radio resources on a semi-static basis, whereas allocation of timeslots refers to the dynamically changing permission to use those resources that have been assigned to a user and are shared with other users. In this case radio resources are physical data channels (PDCHs), i.e. timeslots, provided by the network to the mobile station.

In EGPRS, two uplink allocation methods exist, dynamic allocation (DA) and extended dynamic allocation (EDA). In dynamic allocation, if the mobile device sees its value of the USF in a downlink timeslot, it is then permitted to transmit in the uplink timeslot with the same timeslot number. In extended dynamic allocation, if the mobile device sees its value of the USF in a downlink timeslot, it is then permitted to transmit in the uplink timeslot with the same timeslot number and all the assigned uplink timeslots with a higher timeslot number. The USF is received in one radio block period and the transmission takes place in the next radio block period.

Initially, in EGPRS, the number of timeslots assigned in uplink and downlink had to be such that their sum does not exceed the parameter "Sum", which is a characteristic of the multislot class of the mobile station (MS). The multislot class indicates the capability of the mobile station and says how many timeslots the mobile can receive and transmit on in a certain period, typically a single time division multiple access (TDMA) frame. In later versions of EGPRS, changes have been made to the way that extended dynamic allocation works [GP-062076, "Flexible timeslot assignment", Siemens Networks, GERAN#32, Sophia Antipolis (France), 13-17 Nov. 2006]. In particular, the flexibility of the allowed multislot configurations has been increased by allowing the possibility that the parameter "Sum" of the MS multislot class applies not to the mobile station's timeslot assignment but to the mobile station's timeslot allocation (as described in sub-clause 6.4.2.2 of 3GPP TS 45.002). In other words, during the session set-up phase, more than "Sum" UL+DL timeslots can be assigned to the mobile station, whilst still respecting the constraints on reception and transmission for the mobile station's multislot class, with the additional constraint that "Sum" needs to be respected only on a dynamic basis, i.e. within every TDMA frame.

This enhancement, referred to as flexible timeslot assignment (FTA), has been endorsed by GERAN, but for use only with extended dynamic allocation. [GP-062382, "CR 45.002-0112 rev 1 Flexible timeslot assignment (Rel-7)", Siemens Networks, GERAN#32, Sophia Antipolis (France), 13-17 Nov. 2006]. It could be that "Sum" is equal to 5, i.e. the sum of the downlink and uplink timeslots is up to 5. Without flexible timeslot assignment, there may be, for example, 1 downlink plus 4 uplink timeslots assigned; or 2 downlink plus 3 uplink timeslots assigned. With flexible timeslot assignment, 4 uplink and 4 downlink timeslots can assigned, but the allocations must not exceed a maximum of 5 timeslots in total.

In EGPRS, FTA is only used with EDA, which is acceptable for basic transmission time interval (BTTI) configurations. However, there are also reduced transmission time interval (RTTI) configurations which have been defined in GERAN [GP-062483, "CR 43.064-0044 rev 5 Introduction of Reduced TTI", Ericsson, GERAN#32, Sophia Antipolis (France), 13-17 Nov. 2006]. Conventionally, one radio block has been sent on only one timeslot in four TDMA frame periods, but in RTTI configurations one radio block is sent on two timeslots in two TDMA frame periods. The same block is transmitted more quickly by taking more physical resources. One possible application for this is voice over internet protocol (VoIP), where voice data is sent as packets which must appear instantaneous to the user. Using RTTI reduces the latency to give this impression. Another possibility is to send the whole block on four timeslots in one TDMA frame period, although this is not in use currently.

Some rules need to be set for the allocation of uplink radio blocks for RTTI configurations. There are a number of issues regarding the allocation of uplink radio blocks for RTTI temporary block flows (TBFs), for example VoIP.

SUMMARY

The inventors propose a method of allocating uplink radio resources to a mobile device; wherein uplink and downlink timeslots are allocated; wherein the sum of the allocated uplink timeslots and the allocated downlink timeslots within a predetermined period is less than the total number of assigned time slots and does not exceed a predetermined maximum; wherein the resources are allocated in a reduced transmission time interval configuration; wherein an indication of the uplink timeslot allocation is received from the network in a downlink timeslot, or downlink timeslot pair, directing the mobile device to transmit only in one uplink timeslot pair.

Uplink resources in a reduced transmission time interval configuration are assigned using flexible timeslot assignment and allocated using dynamic allocation. This means that a single indication in the downlink allows only one specific uplink timeslot pair to be allocated for transmission, rather than that timeslot pair and all subsequent assigned uplink timeslot pairs.

Preferably, the indication of the allocation for an uplink timeslot pair is received in a corresponding downlink timeslot, or corresponding downlink timeslot pair in a radio block period preceding the radio block period to which the indication relates.

All four radio bursts of a radio block may be sent in four timeslots of one radio frame, but preferably, two radio bursts of a radio block are sent in one timeslot pair, in each of two consecutive radio frames.

Thus, the four bursts are sent as two bursts per radio frame.

Preferably, the radio frame is a TDMA frame.

Preferably, for each of the assigned uplink timeslot pairs, the mobile device monitors for an uplink status flag, a downlink timeslot, or downlink timeslot pairs corresponding to the assigned uplink timeslot pair.

Preferably, the monitoring starts with the downlink timeslot, or timeslot pair corresponding to the lowest numbered assigned uplink timeslot pair and continues up to the downlink timeslot, or timeslot pair which the mobile is able to monitor, taking into account the timeslot pairs allocated for transmission in the block period and the switching requirements of the mobile station's multislot class.

Preferably, when the mobile device detects an assigned uplink status flag value on a downlink timeslot, or timeslot pair corresponding to an assigned uplink timeslot pair, the mobile device transmits either a single RLC/MAC block, or a sequence of four RLC/MAC blocks on the uplink timeslot pair.

In some cases, only one USF is allocated to each mobile device, but preferably, a plurality of uplink status flags are assigned to the mobile device, each corresponding to a different temporary block flow.

The method applies to any communication system, where it is not possible to transmit and receive at the same time, but preferably, the method is applied in an enhanced general packet radio service (EGPRS) system.

BRIEF DESCRIPTION OF THE DRAWINGS

An example of a method of allocating uplink radio resources to a mobile device in a reduced transmission time interval configuration will now be described with reference to the accompanying drawings in which.

DETAILED DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

Figure 1:
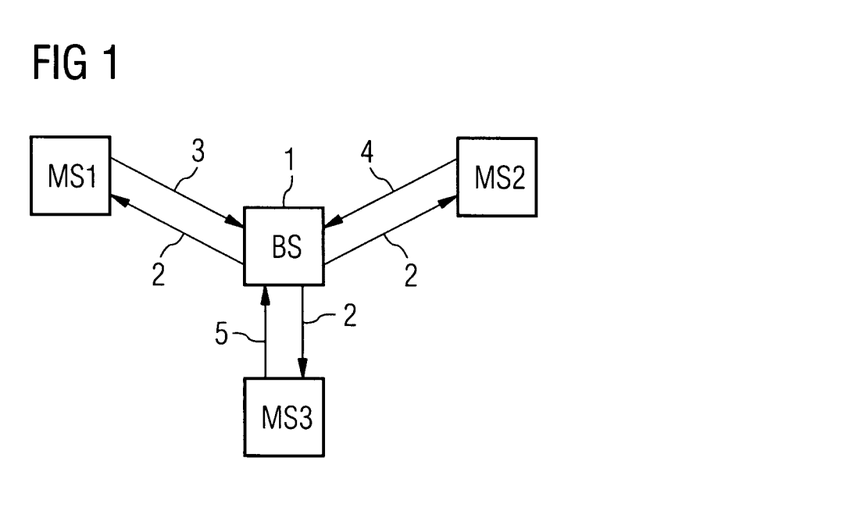
FIG. 1 is a block diagram of a typical communication system in which the proposed method of the present invention is applied.

FIG. 1 illustrates a typical communication system, in which a plurality of mobile devices, or mobile stations, MS1, MS2, MS3 are communicating with a network via a base station 1. In the downlink (DL), the base station sends 2 an indication of allocation of uplink timeslots and the mobile devices are able to transmit 3, 4, 5 in the uplink (UL) according to the allocation.

Figure 2:
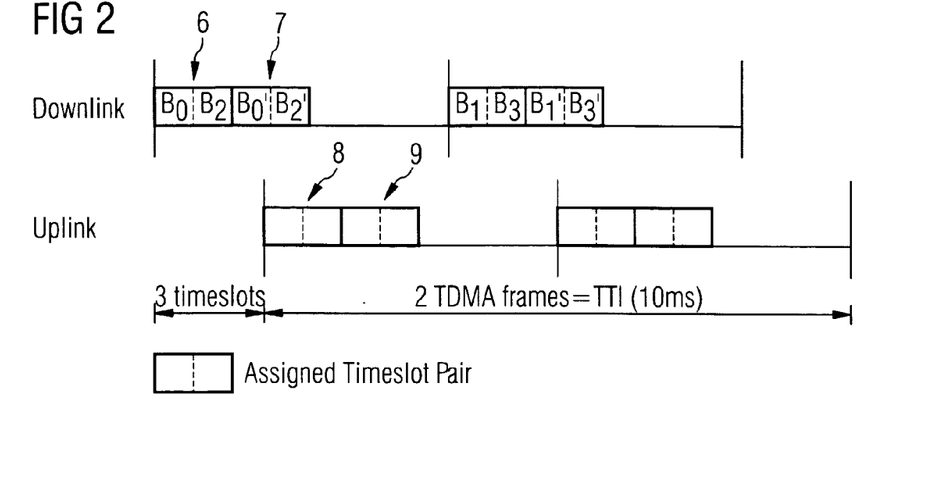
FIG. 2 illustrates assigned timeslot pairs for 4 DL+4 UL assignment for an RTTI TBF.

In FIG. 2, an example is shown in which a mobile device is assigned 4 timeslots in both uplink and downlink, i.e. two timeslot pairs 6, 7 in the downlink and 2 timeslot pairs 8, 9 in the uplink, which can be used to send up to two radio blocks in each direction in a reduced TTI of 10 ms. FIG. 2 also shows how the 4 bursts $B_0$, $B_1$, $B_2$, $B_3$ and $B'_0$, $B'_1$, $B'_2$, $B'_3$, derived from the channel coding of two radio blocks respectively, are mapped to the timeslot pairs in an example where two bursts per TDMA frame are sent. For four bursts per frame, the radio bursts in the second timeslot pair 7 in each TDMA frame would be from the same radio block as in the first timeslot pair 6.

The assignment in FIG. 2 is only possible for mobile stations supporting FTA. Although FTA is a general enhancement for Rel-7, it has particular application for TBFs using RTTI configurations. If RTTI TBFs are assigned without FTA then, due to the requirement to assign timeslots in pairs, in a single carrier configuration the only possible assignments for a type 1 mobile station (MS), in which transmission and reception are not possible at the same time, but timeslots with the same timeslot number can be used in both uplink and downlink, are 2 DL+2 UL; 4 DL+2 UL (which requires multislot class 31) and 2 DL+4 UL (which requires multislot class 33). So a mobile station that can receive on up to 4 timeslots can never transmit on more than 2 timeslots; similarly, a mobile station that can transmit on up to 4 timeslot can never receive on more than 2 timeslots.

In bidirectional communication, such as for VoIP, the data rate requirements in either direction may change due to the varying nature of the radio channel. Switching among different configurations requires explicit signalling from the network and is inefficient. With FTA, additional assignments are possible. For instance, 4 DL+4 UL assignments are possible, as shown in FIG. 2. Then, the parameter "Sum" (and the switching requirements) have to be respected on a dynamic basis; so, for a multislot class 33 mobile, the maximum instantaneous allocations are still 4 DL+2 UL, or 2 DL+4 UL. The network can decide to use the first allocation if more data needs to be transmitted from the network to the mobile station, or to use the second allocation if more data needs to be sent from the mobile station to the network.

EGPRS has two types of uplink allocation, dynamic allocation and extended dynamic allocation. Flexible timeslot assignment (FTA) has conventionally only been valid for extended dynamic allocation. However, FTA with dynamic allocation is desirable because it is valid with reduced transmission time interval (RTTI).

Figure 3A:
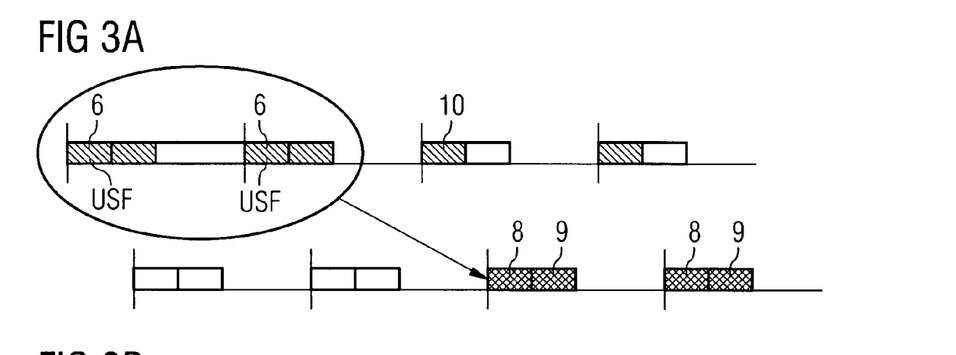
FIGS. 3A and 3B show maximum allocations with a 4 DL+4 UL assignment when using extended dynamic allocation.
Figure 3B:
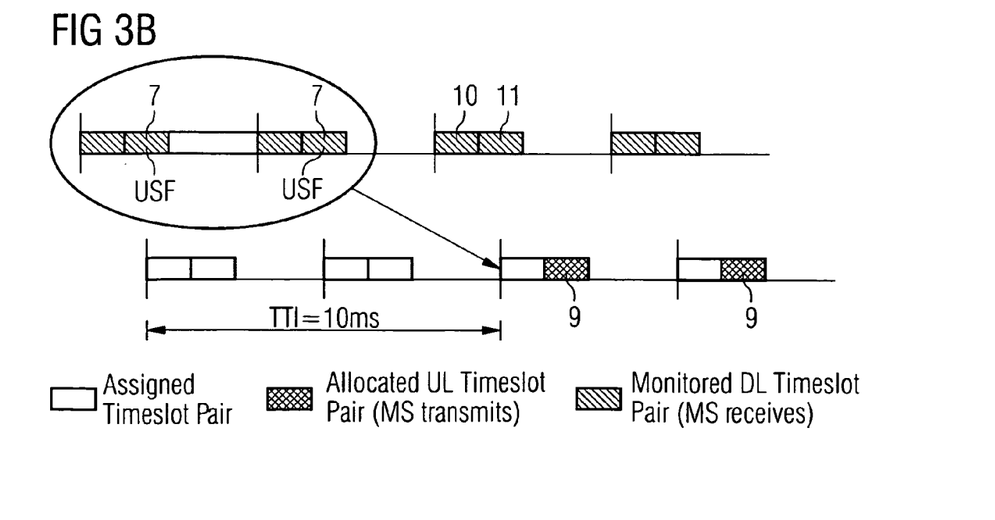

For RTTI TBFs the standards allow two possible strategies for the transmissions of the USF. In the first strategy, "RTTI USF", the USF is transmitted in two consecutive frame periods on a PDCH pair, i.e. a timeslot pair, using the four bursts belonging to one RTTI radio block, as shown in FIG. 3. This is possible if only reduced TTI TBFs are multiplexed on those timeslots, i.e. if a timeslot pair is assigned to only support RTTI TBFs. With current systems, this means that the USF is transmitted in a reduced radio block period (i.e. a period of 10 ms) and allocates uplink radio blocks in the next reduced radio block period. FIG. 3a shows extended dynamic allocation, with the USF set in the first downlink timeslot pair. FIG. 3b shows the USF set in the second downlink timeslot pair.

The alternative strategy, "BTTI USF", is that an USF is mapped on four consecutive bursts transmitted on one timeslot, i.e. two bursts belongs to one RTTI radio block while the other two bursts belong to another RTTI radio block. This mapping allows for multiplexing basic TTI and reduced TTI TBFs on the same timeslot, and requires a basic radio block period (i.e. 20 ms) for the transmission of the USF. In this case one USF is sent on the first timeslot of a downlink timeslot pair and allocates uplink radio blocks in the first two TDMA frames of the next basic radio block period. A second USF is sent on the second timeslot of a downlink timeslot pair and allocates uplink radio blocks in the second two TDMA frames of the next basic radio block period.

The rules for the allocation of uplink radio blocks (in other words how the mobile responds to an assigned USF) in the case of RTTI TBFs need to be defined. This can be done in the same way, irrespective of the strategy used for the transmissions of the USF (either BTTI USF or RTTI USF), so that the RTTI USF transmission strategy is always assumed in the following description.

One possibility is to extend the current rules of EDA to RTTI TBFs, so that they define how radio blocks are allocated on uplink timeslot pairs rather than on single timeslots, as outlined in FIGS. 3A and 3B. If the USF is set in the first DL timeslot pair 6, both the first and the second UL timeslot pairs 8, 9 will be allocated in the next radio block period, while the MS will only be able to monitor 10 the first DL timeslot pair in that radio block period; on the other hand, if the USF is set in the second DL timeslot pair 7, only the second UL timeslot pair 9 will be allocated in the next radio block period, and the mobile will be able to monitor 10, 11 and receive on both DL timeslot pairs in that radio block period.

All the possible uplink and downlink allocations with a 4 DL+4 UL assignment, using EDA, are summarized in Table 1, where a '1' in the allocation means that the assigned timeslot is allocated to the MS and the table shows which combinations of uplink and downlink allocations are, or are not, acceptable.

TABLE 1

| UL | DL | | | |
|---|---|---|---|---|
|  | 00 00 | 00 11 | 11 00 | 11 11 |
| 00 00 | Yes | Yes | Yes | Yes |
| 00 11 | Yes | Yes | Yes | Yes |
| 11 00 | No | No | No | No |
| 11 11 | Yes | No | Yes | No |

The table shows that the first UL timeslot pair 8 can never be allocated on its own, but only together with the second UL timeslot pair 9. This is due to the principles of EDA. This may put some limitations on the scheduling of UL resources, as further discussed below.

Thus, an alternative possibility for the scheduling of RTTI TBFs is to use the possibilities enabled by flexible timeslot assignment but, instead of using EDA operation, extending the rules for dynamic allocation.

In EGPRS, FTA is only used with EDA, which is acceptable for basic transmission time interval configurations. However, when using reduced transmission time intervals (RTTI), this limitation is not appropriate.

Figure 4A:
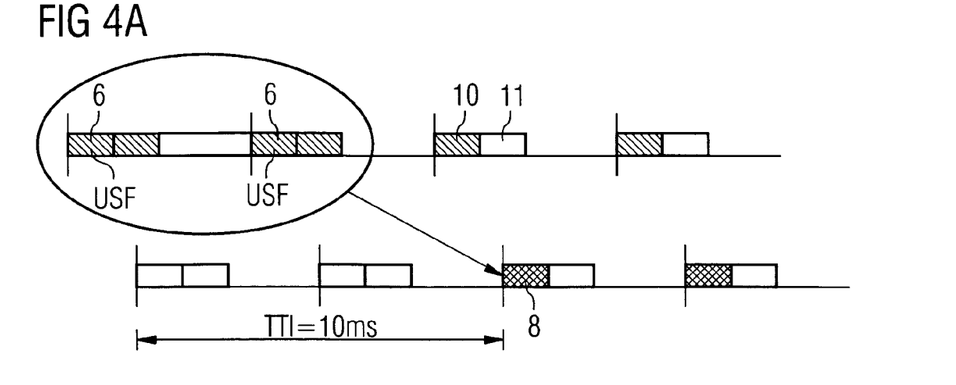
FIGS. 4A, 4B, and 4C show possible allocations with a 4 DL+4 UL assignment when using dynamic allocation in accordance with proposed method.
Figure 4B:
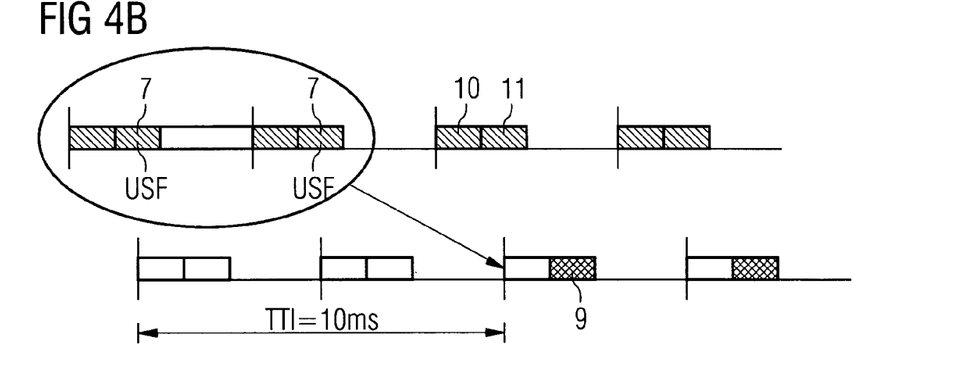
Figure 4C:
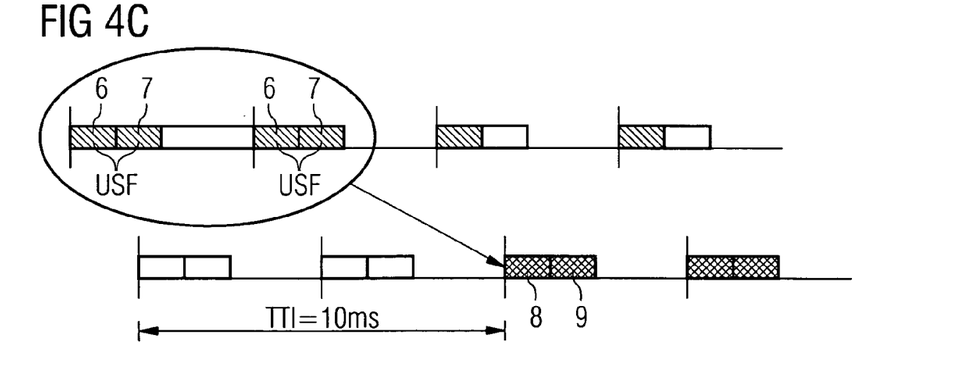

FIGS. 4A, 4B, and 4C define how different dynamic allocations can be performed with a 4 DL+4 UL flexible timeslot assignment for a single mobile device. In FIG. 4a, the USF is set in the first DL timeslot pair 6; in FIG. 4b, the USF is set in the second DL timeslot pair 7; and in FIG. 4c, the USF is set in both the first and the second DL timeslot pairs 6, 7 (assuming the UL allocation is such that the MS can monitor the USF in both DL timeslot pairs).

If the USF is set only in the first DL timeslot pair 6, only the first UL timeslot pair 8 is allocated in the next radio block period (according to DA rules). If the USF is set only in the second DL timeslot pair 7, only the second UL timeslot pair 9 is allocated in the next radio block period. If USFs are set in both the first and the second DL timeslot pairs 6, 7, both UL timeslot pairs 8, 9 are allocated. With dynamic allocation, the transmission is only in the uplink timeslot pair corresponding to the one where the USF is received as shown in FIGS. 4a and 4b. The example of FIG. 4b has the same effect as FIG. 3b, but FIG. 4a has a different effect to FIG. 3a. To transmit in both timeslot pairs 8, 9, it is necessary to send the USF in both downlink timeslot pairs 6, 7.

There is however a difference from conventional DA operation. With the way that DA is defined for BTTI configurations, in every block period the MS must be able to monitor the USF for ALL assigned uplink timeslots regardless of how many uplink timeslots have been allocated during that block period; this is possible if only up to 2 uplink timeslots out of 8 are assigned to the mobile station. With the extension of DA to RTTI TBFs, as described above, it is not possible to satisfy this requirement on monitoring the USF if more than one timeslot pair is assigned. This is the case of FIG. 4, where 2 timeslot pairs, i.e. 4 timeslots, are assigned in the uplink. If the mobile station is allocated the first uplink timeslot pair 8, it is only able to monitor the first DL timeslot pair 10 in that radio block period, but not the second 11. This constraint is similar to the one for extended dynamic allocation. On the other hand, if only the second UL timeslot pair 9 is allocated to the MS, there are no restrictions on monitoring both DL timeslot pairs 10, 11 during that radio block period, i.e. normal DA behavior.

Therefore, for RTTI TBFs, when flexible timeslot assignment is used (i.e. when all the assigned timeslots in downlink and uplink cannot be simultaneously allocated), the mobile station, during a block period in which it has been granted permission to transmit, monitors for the USF in the downlink timeslots or timeslot pairs corresponding to its assigned uplink timeslot pairs starting with the downlink timeslot or timeslot pair corresponding to the lowest numbered assigned timeslot pair up to the downlink timeslot or timeslot pair which the mobile is able to monitor, taking into account the timeslot pairs allocated for transmission in the block period and the switching requirements of the mobile station's multislot class, as set out in 3GPP TS 45.002. Whenever the mobile station detects an assigned USF value on a downlink timeslot or timeslot pair corresponding to an assigned uplink timeslot pair, the mobile station transmits either a single RLC/MAC block or a sequence of four RLC/MAC blocks on the same timeslot pair for that TBF. This latter feature is valid only if USF_GRANULARITY is defined for RTTI TBFs. USF_GRANULARITY is set out in 3GPP TS 45.002.

All the possible "UL & DL allocations" with a 4 DL+4 UL assignment when using DA are summarized in Table 2.

TABLE 2

| UL | DL | | | |
|---|---|---|---|---|
|  | 00 00 | 00 11 | 11 00 | 11 11 |
| 00 00 | Yes | Yes | Yes | Yes |
| 00 11 | Yes | Yes | Yes | Yes |

TABLE 2-continued

| | DL | | | |
|---|---|---|---|---|
| UL | 00 00 | 00 11 | 11 00 | 11 11 |
| 11 00 | Yes | No | Yes | No |
| 11 11 | Yes | No | Yes | No |

The table shows that there is a higher flexibility in the scheduling of UL resources and in particular that the network is allowed to schedule the two UL timeslot pairs independently.

GP-062266, "RTTI and FANR—preliminary results for VoIP", Siemens Networks, GERAN#32, Sophia Antipolis (France), 13-17 Nov. 2006, shows some simulation results for VoIP when using latency reduction features, including RTTI. In the simulations, a mobile station is granted exclusive use of a downlink and uplink timeslot pair, which is not shared with other users; hence, no allocation strategies are considered. The channel utilization, i.e. the average number of block periods on which the mobile station transmits a radio block, was evaluated. Results ranged from 0.55 (for fairly good radio conditions, where higher modulation and coding schemes could be used and less retransmissions were needed) to about 1.33 (in bad radio conditions, where lower modulation and coding schemes had to be used and more retransmissions were needed). These numbers also reflect the average number of timeslots needed to support a VoIP call in time.

A channel utilization of 1.33 means that the 2 timeslots of an RTTI timeslot pair are each characterized by an individual utilization of 67%. This also means that by reserving only one timeslot pair to the VoIP service it may not be possible to allocate more than one VoIP call at a time. On the other hand, with 2 timeslot pairs (4 timeslots), at least 3 VoIP calls can be handled, assuming the pessimistic scenario where all the users experience bad radio conditions and no DTX functionalities are exploited. In the case where all the users experience better radio conditions (i.e. a channel utilization of 0.55), with 4 timeslots up to 7 VoIP calls (without exploiting DTX) can be handled.

Therefore, an efficient use of the resources is only possible if 4 DL+4 UL assignments are possible, i.e. if FTA is used. In addition, full flexibility in scheduling of UL resources, meaning the possibility to schedule the two UL timeslot pairs independently, is required, which is made possible by using FTA with dynamic allocation for timeslot pairs in RTTI configurations.

Figure 5A:
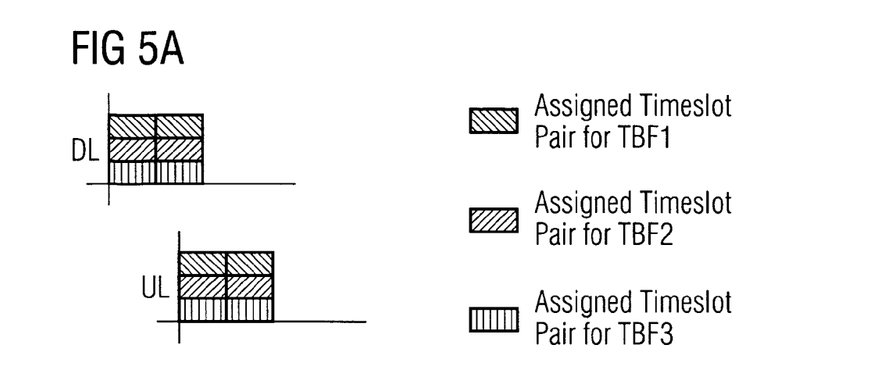
FIGS. 5A and 5B is an example of allocations to 3 different mobile devices or TBFs all sharing the same 4 DL+4 UL assignment, using dynamic allocation for timeslot pairs in accordance with the proposed method.
Figure 5B:
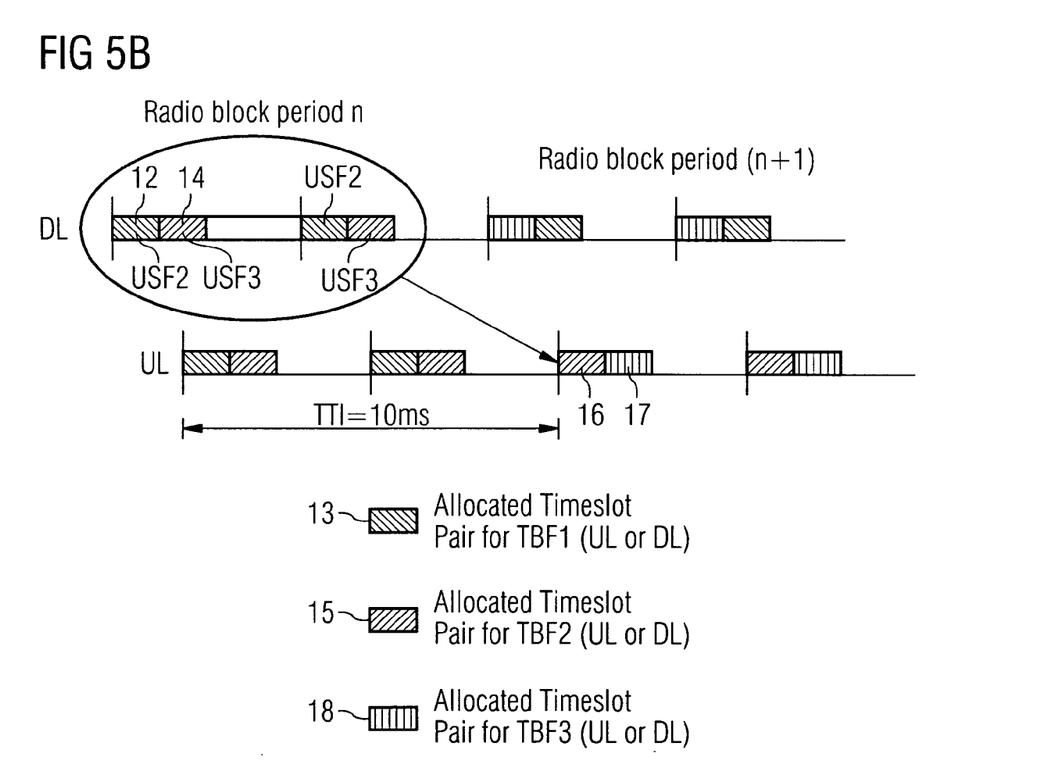

FIGS. 5A and 5B show an example for three mobile devices where 4 DL+4 UL timeslots are assigned to 3 different TBFs and where dynamic allocation for timeslot pairs is assumed. The TBFs may all belong to different MSs, or more than one TBF could belong to the same MS, if that MS supports the "multiple TBFs" feature. The example shows the scenario where TBF1 needs more resources than TBF2 and TBF3 in the downlink (i.e. a block intended for TBF1 is transmitted in each radio block period, which on average corresponds to the use of a whole timeslot pair), while TBF2 is the one with higher requirements in the uplink. It is also assumed that the USF is transmitted in 10 ms (i.e. the first strategy described above).

As shown in FIGS. 5A and 5B, in radio block period n, in the first downlink timeslot pair 12 a block 13 intended for TBF1 is transmitted, while the USF indicates TBF2; in the second downlink timeslot pair 14 a block 15 intended for TBF2 is transmitted, while the USF indicates TBF3. Hence, in radio block period (n+1), the first uplink timeslot pair 16 is used by TBF2 to transmit a radio block 15, whereas the second uplink timeslot pair 17 is used by TBF3 to transmit a radio block 18.

The method for the allocation of uplink radio blocks for RTTI TBFs, in particular dynamic allocation for timeslot pairs, is particularly useful to increase the efficiency of VoIP services provided over the GERAN. The new allocation strategy in this invention, which is enabled by FTA, makes the VoIP operation more efficient.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

What is claimed is:

1. A method of allocating uplink radio resources to a mobile device;
    wherein uplink and downlink timeslots are instantaneously allocated to the mobile device by a base station;
    wherein uplink and downlink timeslots are flexibly assigned to the mobile device by the base station;
    wherein a sum of the instantaneously allocated uplink timeslots and the instantaneously allocated downlink timeslots within a predetermined period is less than a total number of assigned time slots and the sum does not exceed a predetermined maximum;
    wherein the resources are allocated in a reduced transmission time interval configuration;
    wherein an indication of the uplink timeslot allocation is received from the network in a downlink timeslot, or downlink timeslot pair; directing the mobile device to transmit only in one uplink timeslot pair, and
    wherein the total number of assigned time slots is greater than the sum of the instantaneously allocated uplink timeslots and the instantaneously allocated downlink timeslots within said predetermined period,
    comprising further receiving the indication of the allocation for an uplink timeslot pair in a corresponding downlink timeslot, or in a corresponding downlink timeslot pair, in a radio block period preceding a radio block period to which the indication relates.

2. The method according to claim 1, comprising further sending two radio bursts of a radio block in one timeslot pair, in each of two consecutive radio frames.

3. The method according to claim 2, wherein the radio frame is a TDMA frame.

4. The method according to claim 3, comprising further monitoring each of the assigned uplink timeslot pairs for an uplink status flag, a downlink timeslot, or downlink timeslot pairs corresponding to the assigned uplink timeslot pair.

5. The method according to claim 4, comprising further:
    starting the monitoring with the downlink timeslot, or timeslot pair corresponding to the lowest numbered assigned uplink timeslot pair;
    continuing up to the downlink timeslot, or timeslot pair which the mobile is able to monitor; and
    taking into account the timeslot pairs allocated for transmission in the block period and the switching requirements of the mobile station's multislot class.

6. The method according to claim 5, comprising further transmitting either a single RLC/MAC block, or a sequence of four RLC/MAC blocks on the uplink timeslot pair when the mobile device detects an assigned uplink status flag value on a downlink timeslot, or timeslot pair corresponding to an assigned uplink timeslot pairs.

7. The method according to claim 6, comprising further assigning a plurality of uplink status flags to the mobile device, each corresponding to a different temporary block flow.

8. The method according to claim 7, wherein the method is applied in an EGPRS system.

9. The method according to claim 1, comprising further monitoring each of the assigned uplink timeslot pairs for an uplink status flag, a downlink timeslot, or downlink timeslot pairs corresponding to the assigned uplink timeslot pair.

10. The method according to claim 9, comprising further:
   starting the monitoring with the downlink timeslot, or timeslot pair corresponding to the lowest numbered assigned uplink timeslot pair;
   continuing up to the downlink timeslot, or timeslot pair which the mobile is able to monitor; and
   taking into account the timeslot pairs allocated for transmission in the block period and the switching requirements of the mobile station's multislot class.

11. The method according to claim 9, comprising further transmitting either a single RLC/MAC block, or a sequence of four RLC/MAC blocks on the uplink timeslot pair when the mobile device detects an assigned uplink status flag value on a downlink timeslot, or timeslot pair corresponding to an assigned uplink timeslot pairs.

12. The method according to claim 11, comprising further assigning a plurality of uplink status flags to the mobile device, each corresponding to a different temporary block flow.

13. The method according to claim 1, wherein the method is applied in an EGPRS system.

14. The method according to claim 1, wherein the network decides whether to use a first allocation if more data needs to be transmitted from the network to the mobile device, or to use a second allocation if more data needs to be sent from the mobile station to the network.

15. A user equipment allocating uplink radio resources to a mobile device, the user equipment comprising a processor, the user equipment:
   allocating uplink and downlink timeslots instantaneously to the mobile device using the processor;
   assigning uplink and downlink timeslots flexibly to the mobile device using the processor;
   wherein a sum of the instantaneously allocated uplink timeslots and the instantaneously allocated downlink timeslots within a predetermined period is less than a total number of assigned time slots and the sum does not exceed a predetermined maximum,
   wherein the resources are allocated in a reduced transmission time interval configuration,
   wherein an indication of the uplink timeslot allocation is received from the network in a downlink timeslot, or downlink timeslot pair, directing the mobile device to transmit only in one uplink timeslot pair, and
   wherein the total number of assigned time slots is greater than the sum of the instantaneously allocated uplink timeslots and the instantaneously allocated downlink timeslots within said predetermined period,
   comprising further receiving the indication of the allocation for an uplink timeslot pair in a corresponding downlink timeslot, or in a corresponding downlink timeslot pair, in a radio block period preceding a radio block period to which the indication relates.

\* \* \* \* \*